May 21, 1946.  G. E. ARCHIE  2,400,678

METHOD AND APPARATUS FOR ELECTRICALLY LOGGING WELLS

Filed Nov. 27, 1943  2 Sheets—Sheet 1

Inventor: Gustave E. Archie
By his Attorney:

May 21, 1946.   G. E. ARCHIE   2,400,678
METHOD AND APPARATUS FOR ELECTRICALLY LOGGING WELLS
Filed Nov. 27, 1943   2 Sheets-Sheet 2

Inventor: Gustave E. Archie
By his Attorney

Patented May 21, 1946

2,400,678

UNITED STATES PATENT OFFICE 2,400,678

METHOD AND APPARATUS FOR ELECTRICALLY LOGGING WELLS

Gustave E. Archie, Houston, Tex., assignor to Shell Development Company, San Francisco, Calif., a corporation of Delaware Application November 27, 1943, Serial No. 512,034

5 Claims. (Cl. 175—182)

This invention pertains to the electrical logging of wells, and relates more particularly to improvements in methods and apparatus for electrically logging wells which are empty, or contain a column of an electrically non-conductive fluid, or have been drilled with such non-conductive fluid.

In order to obtain, by electrical logging methods, a satisfactory criterion as to the nature and properties of the various strata traversed by a borehole, and as to the amount and character of the fluids present in said strata, it is primarily necessary to determine the following quantities: first, the resistivity of said strata, and second, the spontaneous potential differences occurring between points in the well or adjacent thereto.

Resistivity is usually measured, and plotted or recorded against depth in the form of so-called resistivity curves, by applying a potential between electrodes placed at different levels at or within the well, and simultaneously indicating the potential appearing at other electrodes, similarly arranged, to which no outside potential is applied.

Spontaneous potentials may be measured and plotted or recorded against depth in the form of so-called spontaneous or self-potential curves, by means of a similar arrangement wherein no outside potential is applied to the first-named electrodes, and the potential appearing at the second-named electrodes is therefore their natural or spontaneous potential.

The measurement of either of these quantities in boreholes filled with an electrolytic fluid presents no especial difficulties and is readily carried out by standardized methods.

On the other hand, considerable difficulties are encountered in electrically logging empty boreholes, boreholes filled with an electrically non-conductive fluid, such as oil, and boreholes which may contain a conductive or a non-conductive fluid, but which have been drilled with an oil-base mud, and in which an electrically non-conductive mudsheath adhering to the walls of the borehole serves as an insulating layer between the fluid surrounding the electrodes within the borehole proper, and the fluid filling the pores and interstices of the formations traversed by said boreholes.

It has been known to use in such case brush-type electrodes adapted to contact the walls of the borehole by friction, or electrolytic or porous type electrodes, wherein a container made of a porous material and containing an electrolytic liquid is moved throughout the borehole likewise in direct contact with its walls.

Such electrodes, however, have been found unsatisfactory in practice. Brush-type electrodes generate spurious potentials, due to electrolytic and contact or friction effects related to the metallic nature of said electrodes. Porous or electrolytic type electrodes fail to detect formation layers, or to give a curve having sufficient relief characteristics, in cases where a layer or layers traversed by the borehole contains a fluid of approximately the same saline concentration as electrolyte used in the porous electrode.

It is therefore an object of this invention to provide a method and apparatus for electrically logging empty wells, wells containing a non-electrolytic fluid, and wells having on the walls thereof an electrically non-conductive mudsheath.

It is also an object of this invention to provide a method and apparatus for determining or estimating the saline concentration of the formation fluid or fluids.

It is also an object of this invention to provide a method and apparatus ensuring the detection in a single run of all layers containing saline fluids, irrespective of the concentration of dissolved salts in said fluids.

It is also an object of this invention to provide an electrical logging apparatus comprising electrolytic type electrodes wherein a positive contact between the electrolytes in the formation and the electrolytes of the electrode is insured by maintaining the electrolyte within the electrode at a pressure higher than that surrounding the electrode.

These and other objects of the present invention will be understood from the following description taken with reference to the attached drawings, wherein.

Briefly, the present invention consists in replacing one of the electrodes of a conventional multielectrode logging system with a plurality of porous type electrodes adapted to come into contact with the walls of the borehole, each of said porous electrodes being impregnated with or containing a liquid having electrolytic properties different from those of the other electrodes, such, for example, as solutions of different salts, or solutions of the same salt in varying degrees of concentration.

It is understood that said plurality of electrolytic electrodes is used to replace a single electrode of the conventional logging systems, and more particularly the electrode that is lowered into the borehole in contact with the borehole fluid to measure spontaneous or self-potential effects. The function of the present electrodes is thus to effect the simultaneous measurement and simultaneous but separate recording of several spontaneous potentials, whose values are functions of the electrolytic properties of the solutions impregnating the present porous electrodes when said solutions form liquid junctions with the liquid of the formation. Other electrodes which are used in conventional systems to measure and record other quantities, for example, the formation resistivities, simultaneously with spontaneous potential values, can obviously also be constructed and used in conjunction with and in a manner similar to that of the electrodes described hereinbelow, but reference to such electrodes will be omitted in order to simplify the present description and drawings.

Figure 1:
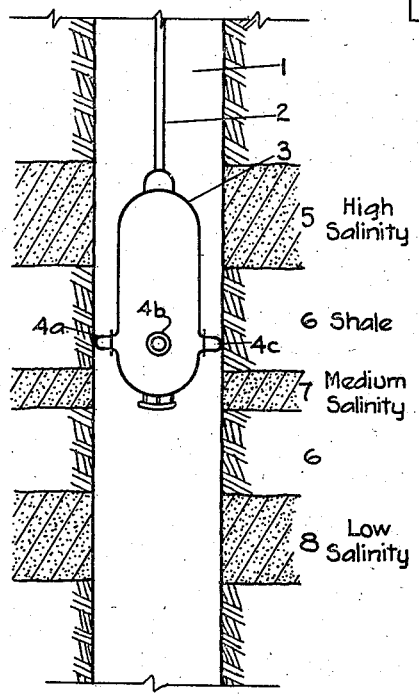
Fig. 1 is a schematic representation of a borehole containing the electrodes of the present invention.

Referring to Fig. 1, the numeral 1 indicates a borehole which is empty, or filled with oil or an oil base mud, or has been drilled with oil or an oil base mud. A cable 2, comprising a desired number of insulated conductors, supports a housing 3 holding the electrodes 4a, 4b and 4c of the invention. The electrode 4a is a porous electrode impregnated or filled with an electrolyte of low concentration, while electrodes 4b and 4c contain electrolytes of, respectively, medium and high concentration.

Figure 2:
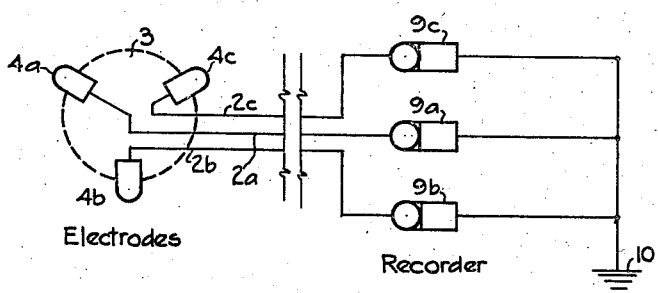
Fig. 2 is a simplified diagram of the electrical circuit connecting said electrodes to the indicating or recording apparatus.

Fig. 2 shows diagrammatically the electrical circuit connecting the electrodes 4a, 4b and 4c, through cable conductors 2a, 2b and 2c, to the amplifying and indicating or recording instruments schematically shown at 9a, 9b and 9c, which are grounded as shown at 10. The instruments 9a, 9b and 9c are adapted for simultaneously and separately recording the spontaneous potential appearing at electrodes 4a, 4b and 4c, as said electrodes are moved along the borehole in contact with the borehole walls, and are provided with the conventional means for correlating said potentials with proper depths.

The formations traversed by the borehole are represented, by way of example, as comprising impermeable formations 6, such as shale; a permeable formation 5, containing a highly saline brine; a thin permeable formation 7, containing a brine of medium salinity; and a permeable formation 8, containing a brine of low salinity.

As stated above, the object of using electrolytic or porous electrodes is to obtain, in an empty or oil-filled borehole, a self-potential curve which can be reliably used for detecting and correlating all the layers traversed by the borehole, and for determining or estimating the salinity of the formation water contained therein.

In order to interpret resitivity curves for oil, gas or water content or the per cent porosity of formations (see applicant's Tech. Pub. 1422, A. I. M. M. E., "The electrical Resistivity Log as an Aid in Determining Some Reservoir Characteristics"), it is necessary to know the salinity of the formation water. This can be done according to the present invention by simultaneously tracing a plurality of spontaneous potential curves obtained with a plurality of porous electrodes filled with different electrolytes.

Figure 3:
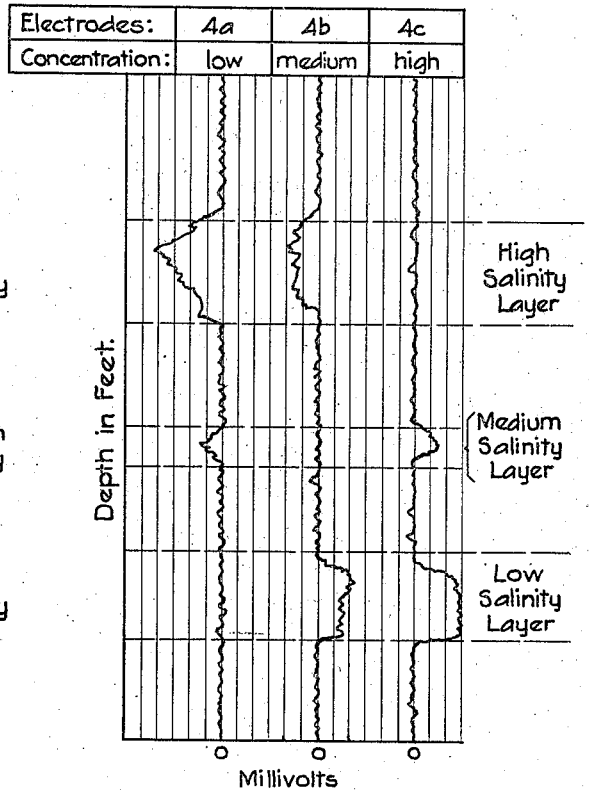
Fig. 3 is an electrical log obtained by the present method in the borehole of Fig. 1.

The use of the present method is illustrated in Fig. 3 with regard to conditions often encountered in the Gulf Coast and Mid-Continent areas. In these areas, the predominant salt in the formation waters in and nearby the petroleum bearing formations is sodium chloride. The electrodes 4a, 4b and 4c are therefore filled with a sodium chloride solution having different concentrations for each electrode. For example, electrode 4a may comprise a solution containing 1000 milligrams of NaCl per liter, electrode 4b with a solution containing 10,000 milligrams per liter, and electrode 4c with a solution containing 100,000 milligrams per liter.

When the concentration of the liquid in the electrode approximates that of the formation, little or no spontaneous potential will be recorded at the level of said formation as compared with that recorded against shale formations, which is or is assumed to be zero. When, however, the concentration of the liquid in the electrode differs greatly from that of the formation, the spontaneous potential will be large.

Thus, referring to the curve of the low concentration electrode 4a, it will be seen that this electrode will show a high spontaneous potential, for example, 16 millivolts, at the level of the highly saline layer 5. A much smaller deflection, for example, 5 millivolts will appear at the level of the moderately saline layer 7, while no deflection at all will be indicated at the level of the weakly saline layer 8.

The medium-concentration electrode 4b shows a much smaller deflection than electrode 4a, for example, 7 millivolts, at the level of the highly saline layer 5, no deflection at the level of the moderately saline layer 7, and a deflection of reversed polarity at the level of the low-salinity layer 8, indicating that the concentration of the electrode liquid is at this point greater than that of the formation fluid.

The high-concentration electrode 4c gives no deflection at the level of the high-salinity layer 5, a deflection of 5 millivolts at the level of layer 7, said deflection being of a polarity opposite to that obtained at the same level with electrode 4a, and a greater deflection, for example, 12 millivolts, than that obtained with electrode 4b at the level of the low salinity layer 8.

It will be seen that a particular advantage of the present method lies in the fact that all the water-bearing layers traversed by a well, irrespective of their salinity, may be detected in a single run. Thus, a system using only one electrolytic electrode would miss at least one of the layers illustrated in the example of Fig. 3.

The relation between the spontaneous potential in a borehole filled with non-conducting fluid, and the concentration of the electrolytes in the electrode and in the permeable formation, may be expressed as $$S.\ P. = K \log_{10} \frac{C_1}{C_2}$$

where $C_1$ and $C_2$ are the concentrations of the electrolytes and $K$ a constant depending on the types of formations in contact and the types of electrolytes contained in the formation. (See Vol. 110 A. I. M. M. E., pages 277–278, C. and M. Schlumberger and E. G. Leonardon.) In actual practice $K$ also depends on the thickness of the layers. Only the thick formations will register the true S. P. and thin layers have a reduced value because of their thinness. Therefore, $K$ will change from layer to layer even in the same well. Another advantage of the present method lies therefore in the possibility to evaluate K, which can be done when more than one S. P. curve is obtained using different values of $C_2$ in the electrode, since, by properly selecting the concentration of the electrolytes used in the present electrodes, and by calibrating said electrodes under conditions of known formation water salinities, it is possible to prepare a set of calibration curves from which the salinity of the formation waters encountered in any particular well can be at once determined or accurately estimated.

It will be further appreciated that since fluid flow conditions and rates in wells and formations traversed thereby often change in an unpredictable manner, it is essential that all spontaneous data collected by means of the present system may be referred to the same set of conditions, i. e. may be collected at the same reference time in a single run.

Figure 4:
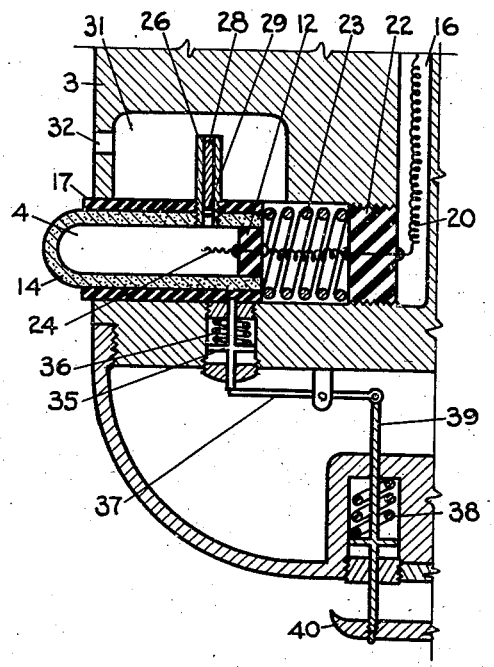
Fig. 4 is a cross-section view of a portion of a housing containing the present electrodes.

The particular arrangement of the present electrolytic or porous electrodes is shown in greater detail in Fig. 4, giving a cross-section view of a portion of the housing 3 of Fig. 1.

A hollow cylindrical electrode 4, made of a porous non-conducting material, such as fused alumina, sintered glass, etc., is slidingly fitted in a suitable bore within the casing 3. The electrode 4 has a preferably spherical closed outward end 14, and has the other end of its bore closed by an insulator plug 12, through which a metallic, e. g. platinum, electrode 24 extends into the space within the hollow electrode 4, filled with a suitable electrolyte which impregnates the porous walls of the electrode. A different electrolyte, such as sodium, potassium, or silver chloride, copper sulphate, or any other suitable electrolyte, or different concentrations of the same electrolyte are used for each of the several electrodes carried by housing 3, as already stated.

An electrical conductor 20, passing through the plug 12, a second plug 22, a bore 16 in the housing, and the cable 2, connects the electrode 4 into the circuit shown in Fig. 2.

A protective tubular member 17, made of a plastic material, is fitted around the electrode 4 and moves axially together therewith under the action of a spring 23, which is installed between the plugs 12 and 22 and is adapted to force the electrode 4 against the walls of the borehole.

In order that the spontaneous potential due to the liquid junction between the electrolyte of the electrode and that of the formation take place at the actual point of contact between the porous electrode and the wall of the borehole, and not at some point within the porous body of the electrode, and in order that the formation fluid may not penetrate the porous electrode and displace or modify the nature or concentration of the electrolyte impregnating said electrode, it is desirable that the electrode liquid be maintained at a pressure higher than the outside pressure surrounding the electrode. A tube 26, open at the top, may therefore be fitted through the walls of the members 17 and 4 and is filled with a column of mercury 28, standing therein on top of a movable plug or plunger 29, separating said mercury from the liquid of the electrode. The upper end of the tube 26 being open to a chamber 31, which is in communication with the well through an opening 32, the pressure within the electrode 4 is at all times equal to the outside pressure plus the pressure of the mercury column.

Since it may sometimes be desirable to lower the housing 3 into the borehole with the electrodes in a retracted position, for example, to protect said electrode from damage by contact with the casing installed in the upper portion of the borehole, the electrodes may be maintained in said retracted position against the action of the spring 23, by means of a latch mechanism comprising a plunger 35, a pivoted trigger 37, a stem member 39, and a contact member 40, outwardly carried by the housing 3.

The plunger 35 engages the tube 17 of the electrode 4 against the action of a spring 36, being maintained in that position by the trigger 37, which is in turn responsive to the pressure exerted on stem 39 by a spring 38.

When the contact member 40 strikes the bottom of the well, the trigger 37 releases the plunger 35, and the spring 23 expands the electrode into contact with the wall of the borehole.

Figure 5:
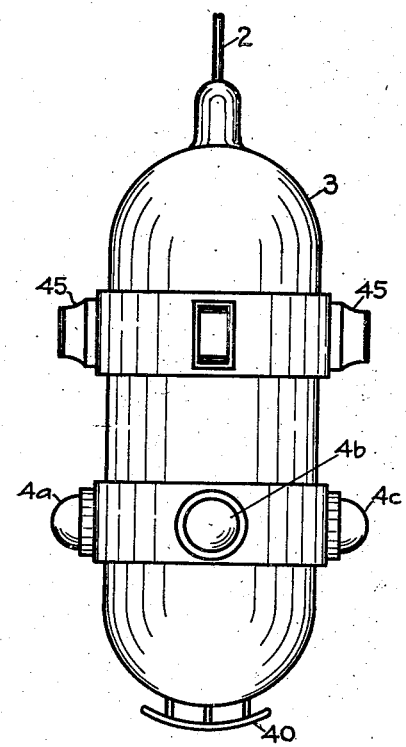
Fig. 5 is a view of an electrode housing provided with cutting elements for removing the mudsheath.

Such procedure is of especial advantage when it is desired to log the well only on the upward run of the electrodes. Thus, in logging wells which had been drilled with an oil-base mud and which have an electrically non-conductive mudsheath on the walls, it may be necessary to remove said sheath by means of cutting blades which may be mounted on the housing 3 as shown at 45 in Fig. 5. These blades may be of a retractable type, as disclosed in the applicant's co-pending application Serial No. 447,867 filed June 20, 1942.

In such cases, the housing 3 is lowered to the bottom of the well, the electrodes 4 expanded by contact of the member 40 with the base of the well, and the housing is then raised to the surface by the pull of the cable 2 with the electrodes 4 in contact with portions of the borehole wall freshly freed of the mudsheath by the cutting effect of the blades 45.

I claim as my invention:

1. In a method for determining the salinity of the liquid present in the formations traversed by a borehole not containing an electrically conductive liquid, the steps of positioning at substantially the same level in the borehole a plurality of confined electrolyte bodies each having different calibrated electrolytic properties, causing a plurality of spontaneous potentials to be created by establishing a liquid junction between each of said electrolyte bodies and the formation liquid, simultaneously and separately recording said spontaneous potentials, and determining the salinity of said formation liquid by comparing the values of the spontaneous potentials created at the junctions of said formation liquid with each of said calibrated electrolyte bodies.

2. In a method for determining the salinity of the liquid present in the formations traversed by a borehole not containing an electrically conductive liquid, the steps of positioning at substantially the same level in the borehole a plurality of confined electrolyte bodies of different calibrated concentrations, causing a plurality of spontaneous potentials to be created by establishing liquid junction contact points between each of said electrolyte bodies and the formation liquid, displacing said contact points in fixed relationship to each other along the axis of the borehole, simultaneously and separately recording the variations of said spontaneous potentials during said displacement, and determining the salinity of said formation liquid by comparing the values of the spontaneous potentials created at substantially the same levels in the borehole during said displacement at the junctions of said formation liquid with each of said calibrated electrolyte bodies.

3. For use in a well-logging system comprising recording means at the surface for tracing spontaneous potential curves, a housing adapted to be moved in the well, a plurality of porous electrodes carried by said housing, each of said electrodes being impregnated with an electrolytic liquid having calibrated electrolytic properties different from the liquids impregnating the other electrodes, said electrodes being adapted to contact the walls of the well, and conductor means for electrically connecting each of said electrodes to said recording means at the surface.

4. For use in a well-logging system comprising recording means at the surface for tracing spontaneous potential curves, a housing adapted to be moved in the well, a plurality of hollow porous electrodes carried by said housing, each of said hollow porous electrodes containing an electrolytic liquid having calibrated electrolytic properties different from the liquids contained in the other electrodes, said hollow porous electrodes being adapted to contact the walls of the well, and conductor means for electrically connecting each of said electrodes to said recording means at the surface.

5. For use in a well-logging system comprising recording means at the surface for tracing spontaneous potential curves, a housing adapted to be moved in the well, a plurality of electrodes carried by said housing, each of said electrodes comprising a hollow member containing an electrolytic liquid having calibrated electrolytic properties different from the liquids contained in the other electrodes, each of said members having a porous portion impregnated with said liquid, said porous portion being adapted to contact the walls of the well, means for maintaining the liquids in said electrodes at a pressure higher than that obtaining outside the porous portions of said electrodes, and conductor means for electrically connecting each of said electrodes to said recording means at the surface.

GUSTAVE E. ARCHIE.